May 15, 1951     W. H. STOUT     2,552,599
CONDUIT PIPE

Filed Jan. 8, 1947

INVENTOR.
WILLIAM H. STOUT

BY *(signature)*

ATTORNEY

Patented May 15, 1951

2,552,599

UNITED STATES PATENT OFFICE 2,552,599

CONDUIT PIPE

William H. Stout, Portland, Oreg.

Application January 8, 1947, Serial No. 720,755

1 Claim. (Cl. 138—76)

This invention relates to non-metallic pipes and conduits, in particular those used for carrying water and other liquids.

An object of the present invention is to provide an improved conduit-pipe having a body formed from an impregnated vegetable fiber material and having a non-metallic reinforcement winding.

Conduits of various types have previously been formed of such materials as cardboard, coated or impregnated with asphalt or other waterproofing or strengthening compounds and reinforced with an outer spiral winding of wire. But such conduits generally deteriorate rapidly due chiefly to the fact that the wire or metal rusts in a comparatively short space of time causing such conduits to go to pieces as soon as the outer reinforcement is broken. While attempts have been made to prevent such rusting and failure of the wire winding by an additional outer layer of asphalt-impregnated cardboard over the wire, this still has not prevented such conduits from being relatively short lived inasmuch as the asphalt is not capable of preventing all water vapor from passing through such impregnated material.

In my efforts to develop an improved conduit-pipe which would be capable of long life and service, I have found that modern fiber glass can be employed very satisfactorily as a reinforcement, in place of the common metal wire winding, and thus can be used very effectively for non-metallic conduits which require such outer reinforcement. The fiber glass not only serves the same purpose as the wire or metal reinforcement in preventing expansion and rupture of the conduit from pressure within the conduit, but it also has the additional advantage of not deteriorating when subjected to moisture.

Therefore, another object of this invention is to provide a non-metallic conduit-pipe suitable for carrying liquids in which fiber glass will serve as the necessary reinforcement in place of the customary wire winding.

I have also discovered that other materials, particularly some of the modern thermo-plastics and the like, afford a better shield against moisture penetration than the commonly used asphalt and can be used to advantage, in combination with vegetable fibers and vegetable fiber products, in the construction of conduits for liquids, provided such construction includes adequate reinforcement for the conduit or pipe so as to prevent any tendency of the conduit to expand under the development of inside pressure.

Accordingly, an additional object of this invention is to provide a composite conduit-pipe in which the moisture-impervious qualities of modern plastic materials will be utilized in conjunction with this stretch-resisting qualities of fiber glass as a reinforcing medium.

These various objects and other advantages I have been able to attain by making an improved conduit-pipe in the manner hereinafter briefly described with reference to the accompanying drawings.

Figure 2:
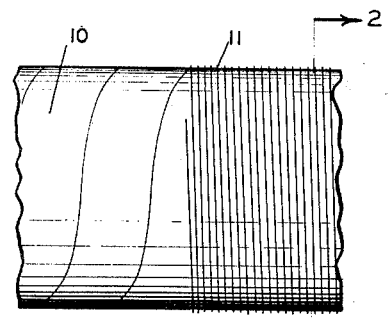
Fig. 2 is a cross section of the conduit-pipe taken on line 2—2 of Fig. 1.
Figure 1:
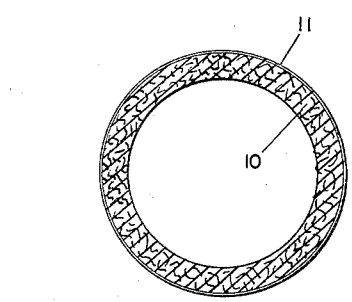
Fig. 1 is a fragmentary side elevation of a conduit-pipe formed in accordance with my invention, a portion of the outer reinforcement having been removed to show the underlying conduit tube.
Figure 5:
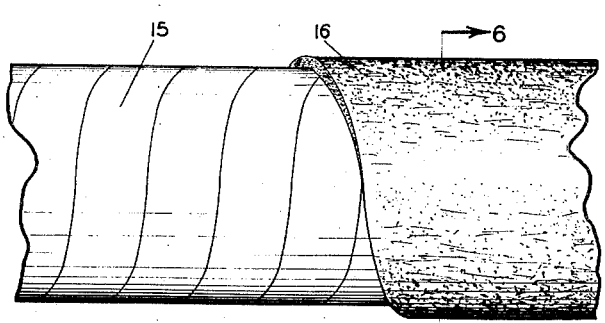

Fig. 5 is a fragmentary side elevation of another slightly modified conduit-pipe also formed in accordance with my invention; and Referring first to Figs. 1 and 2, the conduit-pipe of these figures includes a cylindrical tube 10 composed of spirally-wound layers of cardboard, or similar material, impregnated with asphalt. The making of tubes of this type from cardboard, heavy paper, or similar material, comprising wood fiber pulp stock, is well known in the art and need not be described. The cardboard or heavy paper is impregnated with asphalt either before it is formed into the tube or while it is being so formed, or a coating of asphalt can be spread over each layer as it is wound on the tube and the inside and outside of the completed tube be given a final coating. When the tube has been formed in any of the ways indicated, an outer reinforcement winding 11 of thin threads of fiber glass is used for covering the tube. Since the fiber glass threads will not stretch to any appreciable extent, this outer reinforcement winding serves the same purpose as the common outer winding of metal wire and thus enables the tube 10 to retain its proper shape and diameter under pressure conditions. However, since the fiber glass threads do not rust or deteriorate under contact with moisture this special reinforcement winding will not be injured by the passage of any water vapor or moisture through the tube wall or by contact with any moisture from the outside of the conduit-pipe.

Figure 4:
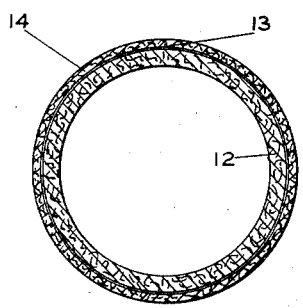
Fig. 4 is a cross section on line 4—4 of Fig. 3.
Figure 3:
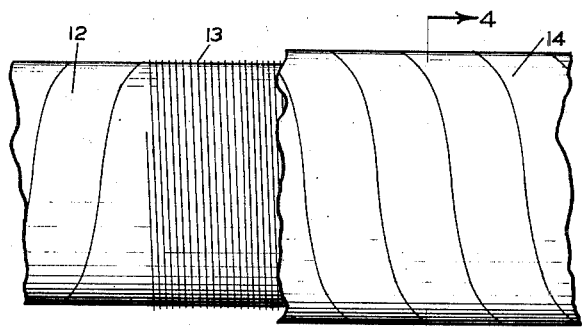
Fig. 3 is a fragmentary side elevation of a similar conduit-pipe having an additional outer layer or protective covering over the reinforcement, portions of the outer layer and reinforcement being shown removed for the sake of clarity.

In the modified conduit-pipe illustrated in Figs. 3 and 4, an inner tube 12, somewhat similar to tube 10 of Fig. 1, is composed of paper stock material spirally wound to form a tube. However, the paper stock material in this instance is thoroughly impregnated with plastic, which results in a substantially moisture-impervious tube wall. Next a reinforcement winding of fiber glass threads, similar to the fiber glass winding 11 of Fig. 1, as previously described, is placed over the tube 12. Finally an outer tube 14 of the same plastic-impregnated paper stock material as the inner tube 12, is formed on the outside of the fiber glass reinforcement 13. Preferably this second or outer tube 14 is formed of material spirally wound in a direction opposite of that followed for the forming of the inner tube 12. The outer tube 14 acts as a protecting wall for the fiber glass winding 13 and also gives some additional strength to the conduit-pipe. With this construction it is possible to make a less rigid conduit-pipe than that previously described with reference to Figs. 1 and 2. The plastic used can be of such consistency as to cause the impregnated material to retain a certain degree of elasticity, and the two tubes 12 and 14 can be of less thickness than is customary with the usual impregnated and reinforced cardboard conduits.

Figure 6:
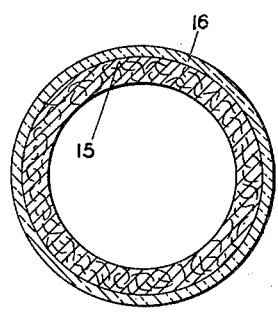

Figs. 5 and 6 illustrate another modified manner in which my invention may be employed in the making of a conduit-pipe having fiber glass reinforcement. The conduit-pipe of these figures includes a tube 15 formed of material composed of loosely felted vegetable or wood fibers impregnated with plastic, the plastic serving both as a binder and as a water-impervious component of the material. The material is formed into a tube in the usual manner by spiral winding, the edges of the convolutions of the spiral being tightly pressed together as the spiral is wound. On the outside of the tube 15 thus formed a fiber glass reinforcement 16 is placed. In this case the fiber glass is formed into a mat and this mat of fiber glass is spirally wound on the outside of the tube 15 as indicated in Fig. 5.

Further modifications of an inner composite non-metallic tube employed in conjunction with a surrounding reinforcement winding of fiber glass material, would be possible within the scope of my invention, and other materials may be combined with the vegetable fibers for making the inner water-proof tube for my conduit-pipe. It would also be possible to mold this inner tube in a single piece from such materials instead of having it formed by spiral winding.

I claim:

In a fluid conduit, the combination of an elastic tube of loosely felted fibers impregnated with plastic rendering said tube water-impervious but of less thickness and strength than will resist rupture by internal fluid pressure or crushing by external pressure in practical use, a wrapping of glass fiber closely wrapped about the outer surface of said tube, and an external casing constituting a protective covering for said tube and wrapping.

WILLIAM H. STOUT.

REFERENCES CITED

The following references are of record in the file of this patent:

UNITED STATES PATENTS

| Number | Name | Date |
|---|---|---|
| 1,325,611 | Baum | Dec. 23, 1919 |
| 2,029,048 | Atwood | Jan. 28, 1936 |
| 2,256,386 | Farrar et al. | Sept. 16, 1941 |
| 2,315,736 | Rosch | Apr. 16, 1943 |
| 2,428,325 | Collins | Sept. 30, 1947 |
| 2,478,181 | Coker et al. | Aug. 9, 1949 |

FOREIGN PATENTS

| Number | Country | Date |
|---|---|---|
| 520,246 | Great Britain | Apr. 18, 1940 |